United States Patent [19]

Cluff et al.

[11] Patent Number: 4,548,963

[45] Date of Patent: Oct. 22, 1985

[54] INTERNALLY CROSSLINKABLE ACRYLIC POLYMERS AND DIGLYCIDYL ESTERS OF DIBASIC ACIDS

[75] Inventors: Stephen L. Cluff, Baton Rouge, La.; Clifford H. Strolle, Springfield, Pa.; Robert D. Breazeale, Wilmington, Del.

[73] Assignee: E. I. Du Pont de Nemours and Company, Wilmington, Del.

[21] Appl. No.: 637,579

[22] Filed: Aug. 3, 1984

[51] Int. Cl.[4] .......................................... C08F 220/20
[52] U.S. Cl. ..................................... 523/427; 525/117; 526/273
[58] Field of Search ............... 523/427, 434; 525/117; 526/273

[56] References Cited

U.S. PATENT DOCUMENTS

| | | | |
|---|---|---|---|
| 2,857,354 | 10/1958 | Fang ..................................... | 526/273 |
| 3,758,448 | 9/1973 | Stamberger ......................... | 526/273 |
| 3,792,011 | 2/1974 | Smith et al. ......................... | 523/427 |
| 4,097,350 | 6/1978 | Pastor et al. ........................ | 526/273 |
| 4,293,475 | 10/1981 | Sidi ..................................... | 526/273 |

*Primary Examiner*—Harry Wong, Jr.

[57] ABSTRACT

Acrylic polymers prepared from hydroxy alkyl esters of acrylic or methacrylic acid, glycidic monomer and ethylenically unsaturated monomer, as well as enamels based on mixtures of such polymers and diglycidyl esters of dibasic acids.

5 Claims, No Drawings

INTERNALLY CROSSLINKABLE ACRYLIC POLYMERS AND DIGLYCIDYL ESTERS OF DIBASIC ACIDS

BACKGROUND OF THE INVENTION

A variety of coating compositions is used for the painting of automobiles, including lacquers and enamels. In general, lacquers have relatively high percentages of solvent and contain high molecular weight polymers. By contrast, enamels are based on low molecular weight polymers which require lower concentrations of solvent. In order to achieve equivalent protection using enamels, the molecular weight of the polymers used in enamels is increased through crosslinking. Typically, acid catalyzed reactions are used for crosslinking, with melamine formaldehyde resins as crosslinking agents, in combination with elevated temperatures, for example, of about 250° F.

Enamels based on acrylic polymers are particularly desirable in automotive applications, since these enamels are especially resistant to gasoline and brake fluid. However, the use of melamine formaldehyde crosslinking agents typically results in the emission of alcohols or formaldehyde from the crosslinking reaction combined with a significant weight loss that causes shrinkage of the films made from the enamels. Accordingly, effort has been directed toward the development of improved crosslinking systems which avoid these potential difficulties in the curing reaction and in the final crosslinked product.

SUMMARY OF THE INVENTION

The present invention is based on the discovery of acrylic polymers which can be crosslinked with no emission of alcohol or formaldehyde in the crosslinking reaction, and which result in an all-acrylic system. When incorporated into enamel formulations, cured enamels resulting from the use of this polymer are particularly useful in exterior applications where exceptional resistance to weathering is required.

Specifically, the instant invention provides an acrylic polymer prepared from a monomer blend comprising
   a. about from 10 to 40% by weight of a hydroxy alkyl ester of acrylic or methacrylic acid wherein the alkyl group has from 2–10 carbon atoms,
   b. about from 10 to 40% by weight of at least one glycidic monomer selected from the group consisting of glycidyl acrylate, glycidyl methacrylate and allyl glycidyl ether, and
   c. about from 20 to 80% by weight of at least one ethylenically unsaturated monomer polymerizable with the hydroxyl alkyl ester and the glycidic monomer.

The present invention further provides an enamel composition comprising
   (a) about from 35 to 75% by weight solids made up of
      (1) about from 80 to 50% by weight polymer as defined above and
      (2) about from 20 to 50% by weight diglycidyl ester of an aliphatic or alicyclic dibasic acid having from 2 to 12 carbon atoms,
   (b) about from 60 to 20% by weight solvent and
   (c) about from 0.1 to 5.0% by weight crosslinking catalyst.

DETAILED DESCRIPTION OF THE INVENTION

The polymers of the present invention are prepared by polymerization of at least three monomers.

The polymers of the present invention are prepared from about from 10 to 40% by weight of a hydroxy alkyl ester of acrylic or methacrylic acid. The alkyl groups in this component contain from 2–10 carbon atoms. These esters can include, for example, hydroxyethyl acrylate, hydroxyethyl methacrylate, hydroxypropyl methacrylate, hydroxybutyl methacrylate, hydroxyoctyl methacrylate, hydroxypropyl acrylate, hydroxybutyl acrylate, and hydroxyoctyl acrylate. Hydroxyalkyl acrylates and methacrylates are preferred in which the hydroxyl group is primary and the alkyl group has 2-4 carbon atoms. Of these, hydroxyethyl acrylate has been found to be particularly satisfactory.

A second component of the present polymers is a glycidic monomer such as glycidyl acrylate, glycidyl methacrylate and allyl glycidyl ether. This component should comprise about from 10 to 40% by weight of the monomer blend used in the preparation of the polymer.

The third monomer used in the preparation of the present polymers is one or more ethylenically unsaturated monomers copolymerizable with the other components. This monomeric component is present in quantities of about from 20 to 80% by weight of the monomer blend. Such monomers include, for example, vinyl chloride, vinylidene chloride, olefins such as ethylene or propylene, vinyl acetate, conjugated dienes of 4 to 10 carbon atoms such as butadiene, styrene, alkyl substituted styrenes such as o-methyl styrene, alkyl maleates such as dibutyl maleate, esters of methacrylic acid and acrylic acid, preferably alkyl esters having 1–12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate, methyl acrylate, ethyl acrylate, propyl acrylate, butyl acrylate, hexyl acrylate, lauryl acrylate and the like. Mixtures of methyl methacrylate and butyl acrylate have been found to give particularly satisfactory results.

Additional monomeric components can be used in the preparation of the polymer. For example, up to about 15 weight percent of monomers can be added which, in the completed copolymer, enhance the pigment wetting and adhesion characteristics. These include, for example, acrylic acid, methacrylic acid, crotonic acid, maleic acid, fumaric acid, dimethyl aminoethyl methacrylate, oxazolidine methacrylate, vinyl pyridine and n-vinyl pyrrolidone.

The copolymerization of the monomeric constituents can be carried out in an inert solvent in the presence of a free-radical initiator of the peroxide or azo type. Typical solvents which can be used include aromatic solvents such as benzene, toluene, and xylene; esters such as butyl acetate; ethers such as ethylene glycol monoethyl ether acetate; and ketones such as acetone, methyl isobutyl ketone, and methyl ethyl ketone. Initiators which can be used include, for example, benzoyl peroxide, lauroyl peroxide, ditertiary butyl peroxide, cumene hydroperoxide, and azoisobutyric acid dinitrile. If water is used as a solvent, a persulphate-bisulfite initiator is useful. Conventional polymerization temperatures, based on reflux, are used, preferably in the range of about from 50° C. to 200° C. The reaction is carried out to the point that the copolymer has a number average molecular weight (as determined by gel permeation chromatography having polystyrene standards) of about from 1000 to 5500, and preferably about from 4000 to 5000.

The hydroxyl content of the resultant polymer should be about from 2 to 6% by weight, and preferably about from 4 to 5.5%. The ratio of the epoxy to hydroxy units in the copolymer should be at least about 0.5:1 to provide satisfactory crosslinking performance. There is no upper limit for this ratio, since epoxide groups can react with each other to crosslink the polymer. However, a ratio of epoxy to hydroxyl groups of about from 0.5:1 to 2.0:1 is generally used, and a ratio of about 1:1 is particularly preferred.

About from 35 to 75% by weight of the enamel composition should be solids, which, in turn, is made up of from about 80 to 50% by weight of the acrylic polymers of the present invention and about from 20 to 50% by weight of crosslinking agent. The crosslinking agents can be selected from diglycidyl esters of an aliphatic or alicyclic dibasic acid having from 2 to 12 carbon atoms. Particularly prefered are those commericially available from Ciba Geigy as Araldite CY-184 and having the general formula

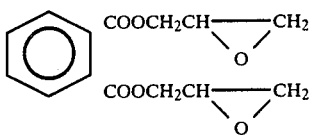

The solvent used in preparation of an enamel should make up about from 60 to 20 weight percent of the entire enamel composition.

In accordance with the present invention, the hydroxyl and epoxy containing polymer is used in conjunction with at least one catalyst to facilitate crosslinking. The specific catalyst selected as well as the quantity incorporated into the enamel composition will necessarily vary with the crosslinking or curing temperatures desired for the final composition. However, is general, about from 0.1 to 5.0% by weight of the polymer is used.

In the event that curing or crosslinking at ambient temperatures is desired, tertiary amine catalysts can be used including, for example, bis(dimethylaminoethyl)ether, tributyamine, tripropylamine, triethylamine, and dodecyl dimethyl amine. In the event that curing or crosslinking at elevated temperatures is acceptable, a wide variety of crosslinking agents can be incorporated into the polymer blend, including, for example, acids with a non-nucleophilic anion, such as sulfonic acid, phosphoric acid, hydrochloric acid, nitric acid, and sulfuric acid. As will be evident to those skilled in the art, these acids can be blocked with amines. Still other catalyts that can be used in the present polymer blends at elevated temperatures include trifluoromethane, benzyltrimethyl ammonium hydroxide and chloride, dodecyl trimethyl ammonium hydroxide and chloride, octadecyl trimethyl ammonium hydroxide and chloride, tetramethyl ammonium hydroxide and chloride, formic acid, acetic acid and propionic acid. Salts of the quaternary compounds noted above can also be used.

In general, non-basic catalysts are preferred, since basic catalysts exhibit some tendency to yellow the cured enamel. Particularly preferred catalysts are the quaternary salts of a volatile organic acid such as formic acid.

The polymers of the present invention are particularly advantageous for the preparation of enamels, using the same solvents as noted above for the preparation of the polymers.

The enamels can be either clear or colored. In the event that a colored enamel is prepared, an amount of colorant typically can be added to provide a ratio of colorant to polymer of about from 0.2:1 to 100:1. Colorants which can be used include metallic oxides such as titanium dioxide or zinc oxide; metal hydroxides; metal flakes; sulfides; sulfates; carbonates; carbon black, silica; talc; china clay; and organic dyes.

Pigments can be introduced into the enamel coating composition by first forming a mill base with the polymer. The mill base can be formed, for example, by conventional sand-grinding or ball-milling techniques, and can then be blended, by simple stirring or agitation, with the other constituents of the coating composition.

The coating composition can also contain ultraviolet light stabilizer, antioxidant, or both. The ultraviolet light stabilizer can be present in an amount of about 1–20% by weight, based on the weight of the polymer blend. The antioxidant can be present in an amount of about 0.1–5% by weight, based on the weight of the polymer blend.

Typical ultraviolet light stabilizers which can be used include benzophenones, triazoles, triazines, benzoates, lower alkyl thiomethylene-containing phenols, substituted benzenes, organophophorous sulfides, and substituted methylene malonitriles. Particularly useful are the hindered amines and nickel compounds shown in U.S. Pat. No. 4,061,616.

Antioxidants which can be used in the present enamels include, for example, tetra-kis alkylene (di-alkyl hydroxy aryl) alkyl ester alkanes, the reaction product of p-amino diphenylamine and glycidyl methacrylate; and alkyl hydroxyphenyl groups bonded through carboalkoxy linkages to a nitrogen atom of a heterocyclic nucleus containing an imidodicarbonyl group or an imidodithiocarbonyl group.

One preferred combination of ultraviolet light stabilizer and antioxidant is 2-hydroxy-4-dodecyloxy benzophenone or a substituted 2(2'-hydroxy-phenyl)benzotriazole and tetra-kis methylene 3(3',5'-dibutyl-4'hydroxyphenyl)propionate methane.

The enamel formulation can also contain flow control agents in an amount of about from 0.005 to 2.0% by weight. The flow control agents can include, for example, silicon fluids and resins, acrylic polymers having molecular weight of about from 1000 to 2500, copolymers of methyl vinyl ether, metal soaps such as zinc stearate, calcium stearate oleates and pelargonates, barium lanolate, microgels of acrylic resins, colloidal silicas and cellulose derivatives.

The coating compositions of this invention can be applied to a variety of substrates by any of the conventional application methods such as spraying, dipping, brushing, or flow coating. Substrates that can be advantageously coated with the present compositions are, for example, metal, steel, wood, glass, or plastics such as polypropylene, polystyrene, copolymers of styrene, and the like. The coatings are particularly suited for application over primed or unprimed metal or steel. Typical uses are for coating steel that has been treated with zinc phosphate, metal substrates pre-coated with conventional alkyd or epoxy primers, and galvanized steel.

The coating can be cured at ambient temperatures or can be cured by heating at 50°–120° C. for 15 minutes to two hours, depending on the choice of curing catalyst, as noted above. When cured at ambient conditions, the coating is tack-free after 1 hour and cures to a hard, solvent resistant coating in 10 days. The coating compositions of the present invention can also be used as a two-coat system in which a first, pigmented coat is applied as previously described over the substrate and is then overlaid with a second, unpigmented coat. This can impart to the finish a gloss or appearance that is improved over that attainable when a single coat system is used. When such a two-coat system is employed, however, the first coat should be allowed to cure to a point where it is tack-free before the second coat is applied. This will normally prevent the solvent in the second coat from attacking the first coat. This attack, or strike-in, can cause the polymers of the two coats to combine at the interface of the coats, negating the improvement in the gloss or appearance.

Regardless of whether a one-coat or two-coat system is used, however, the cured coating is hard, durable, scratch and stain resistant, weather resistant, and chemical resistant. It is suitable, for example, for coating automobile or truck bodies, railroad equipment, appliances, and industrial equipment.

In the present polymers, the combination of hydroxyl and epoxy functionality results in a curing of the coating without the emission of alcohol or formaldehyde in the curing process. In addition, the curing is effected without the weight loss from the final coating that is typically encountered with melamine formaldehyde curing systems, and which causes shrinkage of the final coating.

The invention is further illustrated by the following specific example, in which parts and percentages are by weight unless otherwise indicated.

EXAMPLE I

A hydroxyl containing polymer was prepared from methyl methacrylate, hydroxyethyl acrylate, glycidyl methacrylate, and butyl acrylate from the following solvents and reactant solutions:

| A. Copolymer Preparation | |
| --- | --- |
| | Parts by Weight |
| Portion 1 | |
| Ethylene glycol monomethyl ether acetate | 500.00 |
| Portion 2 | |
| Glycidyl Methacrylate | 338.0 |
| Hydroxyethyl Acrylate | 675.0 |
| Butyl Acrylate | 630.0 |
| Methyl Methacrylate | 608.0 |
| Portion 3 | |
| tertiary-butyl peracetate | 67.5 |
| Ethylene glycol monomethyl ether acetate | 250.0 |

Solvent Portion 1 was charged into a reaction vessel and heated to reflux, approximately 150° C. Reflux was maintained for 30 minutes, after which time monomer Portion 2 and Portion 3 were added simultaneously, with mixing over a 6-hour period. The mixture was maintained at reflux during this time and for an additional hour thereafter. The resulting copolymer had a hydroxyl content of 4.0% by weight and a number-average molecular weight of 2800 (gel permeation chromatography). The copolymer solution had a Gardner-Holt viscosity of 2-5 and a solids content of 75% by weight.

| B. Clear Paint Solution | |
| --- | --- |
| | Parts by Weight |
| Portion 1 | |
| Copolymer Solution | 93.33 |
| Diglycidyl ester of hexahydro orthophthallic acid | 30.00 |
| Portion 2 | |
| Xylene | 21.67 |
| Ethylene glycol monobutyl ether acetate | 21.67 |
| Ethylene glycol monomethyl ether acetate | 21.67 |
| Modaflow(10% soln in xylene) | 3.00 |
| Tinuvin 328 (benzatriazole) | 3.00 |
| Tinuvin CGL-079(Hindered Amine Light Stabilizer)(40% soln in xylene) | 2.50 |
| Portion 3 | |
| Benzyl trimethyl ammonium formate (22% solution in methanol) | 4.55 |

Portion 1 was charged into a stainless steel vessel and mixed for 15 minutes, after which time Portion 2 was added, with mixing continuing for an additional 15 minutes. Portion 3 was then added with mixing until thoroughly blended. This gave a coating composition having a solids content of 52.7% by weight.

| C. Color Coat | |
| --- | --- |
| | Parts by Weight |
| Portion 1 | |
| Copolymer Solution | 93.33 |
| Diglycidyl ester of hexahydroorthophthallic acid | 30.00 |
| Fumed silica (Hydrophobic Type 200 cm$^2$/g) | 5.00 |
| Portion 2 | |
| Xylene | 36.67 |
| Ethylene glycol monobutyl ether acetate | 36.67 |
| Ethylene glycol monomethyl ether acetate | 36.67 |
| Tinuvin 328 (Benzatriazole) | 3.00 |
| Tinuvin CGL-079(HALS)(40% solution in xylene) | 2.50 |
| Aluminum Flake (Alcoa S-8256) | 19.0 |
| Portion 3 | |
| Polyvinyl Pyrrolidone(10% soln in methanol) | 1.30 |
| Benzyl trimethylammonium formate(22% solution in methanol) | 4.55 |

Portion 1 was charged into a stainless steel vessel and mixed for 15 minutes after which time Portion 2 was added. Mixing was continued for an additional 2 hours to insure proper dispersion of the aluminum flake. Portion 3 was then added slowly with mixing until thoroughly blended. This gave a coating composition having a solids content of 43.8% by total weight. The pigment to binder ratio was 24/100. A primed steel substrate of the type used in automobile body panels was sprayed with a color coated type prepared in section C above to a thickness of 0.8 to 1.0 mils and a clear coat of the composition prepared in section B above to a thickness of 1.5 to 2.5 mils by spray application. The coated substrate was baked for 30 minutes at 250° F. The resulting panels were exposed in Florida horizontally for two years on a black box. After two years of exposure, only 4% of the gloss was lost, indicating excellent durability of the enamel systems.

D. Unicoat Enamel
Millbase 1

| | Parts by Weight |
|---|---|
| Portion 1 | |
| Copolymer Solution | 50.0 |
| Toluene | 43.0 |
| Portion 2 | |
| Indanthrone Blue Toner | 7.0 |

Portion 1 was added to a vessel and mixed for 15 minutes. Portion 2 was then added and the mixing continued for 1 hour. The mixture was then charged to sand mill and ground at a temperature of about 35° C.

Millbase 2

| | Parts by Weight |
|---|---|
| Portion 1 | |
| Copolymer Solution | 34.3 |
| Toluene | 57.7 |
| Portion 2 | |
| Monastral Blue Pigment | 8.0 |

Portion 1 was added to a vessel and mixed for 15 minutes. Portion 2 was then added and the mixing continued for 1 hour. The mixture was then charged to a sand mill and ground at a temperature of about 35° C.

Millbase 3

| | Parts by Weight |
|---|---|
| Portion 1 | |
| Copolymer Solution | 25.0 |
| Toluene | 66.1 |
| Portion 2 | |
| Fumed Silica | 8.9 |

Portion 1 was added to a vessel and mixed for 15 minutes. Portion 2 was then added and the mixing continued for 1 hour. The mixture was then charged to a sand mill and ground at a temperature of about 35° C.

Enamel Preparation

| | Parts by Weight |
|---|---|
| Portion 1 | |
| Copolymer Solution | 92.25 |
| Araldite CY-184 | 24.90 |
| Millbase 1 | 4.54 |
| Millbase 2 | 1.13 |
| Millbase 3 | 33.60 |
| Portion 2 | |
| Medium-Coarse Particle Aluminum Flake | 3.17 |
| Portion 3 | |
| Modaflow (Flow control agent, 10% in Xylene) | 3.22 |
| Polyvinyl pyrrolidone(10% in methanol) | 0.75 |
| Benzyltrimethyl ammonium Formate(20% in methanol) | 10.00 |
| Portion 4 | |
| Reducing Thinner (Butyl Cellosolve, Ethyl Cellosolve Acetate, Methyl-Isobutyl Ketone, 15/35/30) | 46.89 |

The ingredients of Portion 1 were added in the order listed, with mixing, to a stainless steel vessel and mixed for 30 minutes. Portion 2 was then added and mixing continued for 2 hours. The ingredients of Portion 3 were also added in the order listed with mixing and allowed to mix for an additional 15 minutes. Portion 4 was added and thoroughly mixed for 15 minutes. The coating composition contained 47.1% solids by weight.

We claim:

1. An enamel composition comprising
   a. about from 35 to 75% by weight solids made up of
      (1) about from 80 to 50% by weight polymer prepared from a monomer blend comprising
         A. about from 10 to 40 weight percent of a hydroxy alkyl ester of acrylic or methacrylic acid wherein the alkyl group has from 2-10 carbon atoms,
         B. about from 10 to 40% of at least one glycidic monomer selected from the group consisting of glycidyl acrylate, glycidyl methacrylate and allyl glycidyl ether, and
         C. about from 20 to 80% by weight of at least one ethylenically unsaturated monomer polymerizable with the hydroxyl alkyl ester and the glycidic monomer,
         and
      (2) about from 20 to 50% by weight diglycidyl ester of an aliphatic or alicyclic dibasic acid having from 2 to 12 carbon atoms,
   b. about from 60 to 20% by weight of solvent, and
   c. about from 0.1 to 5.0% by weight crosslinking catalyst, and wherein the resulting polymer has a hydroxyl content of about from 2 to 6% by weight, and the ratio of epoxy to hydroxy units is at least about 0.5:1.

2. An enamel of claim 1 wherein the diglycidyl ester is

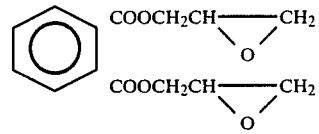

3. An enamel of claim 1 wherein the crosslinking catalyst is a non-basic catalyst.

4. An enamel of claim 3 wherein the catalyst is a quaternary salt of a volatile organic acid.

5. An enamel of claim 1 further comprising colorant in an amount to provide a ratio of colorant to polymer of about from 0.2:1 to 100:1.

* * * * *